US007779284B2

(12) United States Patent
Kumar et al.

(10) Patent No.: US 7,779,284 B2
(45) Date of Patent: Aug. 17, 2010

(54) TECHNIQUES FOR OPERATING A PROCESSOR SUBSYSTEM TO SERVICE MASKED INTERRUPTS DURING A POWER-DOWN SEQUENCE

(75) Inventors: Bhoodev Kumar, Austin, TX (US); Christopher K. Chun, Austin, TX (US); Milind P. Padhye, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 779 days.

(21) Appl. No.: 11/678,440

(22) Filed: Feb. 23, 2007

(65) Prior Publication Data

US 2008/0209233 A1      Aug. 28, 2008

(51) Int. Cl.
*G06F 1/00* (2006.01)
*G06F 1/26* (2006.01)
*G06F 1/32* (2006.01)
*G06F 13/24* (2006.01)

(52) U.S. Cl. .................... 713/324; 713/300; 713/320; 713/323; 710/262

(58) Field of Classification Search ................ 713/300, 713/320, 323, 324; 710/262
See application file for complete search history.

(56) References Cited

U.S. PATENT DOCUMENTS

| | | | | |
|---|---|---|---|---|
| 5,311,441 A | * | 5/1994 | Tayama et al. .......... | 702/63 |
| 5,551,043 A | * | 8/1996 | Crump et al. .......... | 713/323 |
| 7,127,592 B2 | | 10/2006 | Abraham et al. | |
| 2002/0083309 A1 | | 6/2002 | Leibholz et al. | |
| 2004/0215941 A1 | | 10/2004 | Thimmannagari et al. | |
| 2005/0215227 A1 | * | 9/2005 | Vu et al. ............... | 455/343.2 |
| 2006/0053326 A1 | * | 3/2006 | Naveh et al. ........... | 713/323 |
| 2006/0149940 A1 | | 7/2006 | Mukherjee | |

* cited by examiner

*Primary Examiner*—Ji H Bae
(74) *Attorney, Agent, or Firm*—Dillon & Yudell LLP

(57) ABSTRACT

A technique of operating a processor subsystem masks interrupts to the processor subsystem during a power-down sequence of a processor of the processor subsystem. A boot vector for the processor of the processor subsystem is set. The boot vector provides an address associated with a saved processor state. A current state of the processor is saved to provide the saved processor state. The technique determines whether one or more first masked interrupts occurred during the saving of the current state of the processor. The processor that is to be powered-down is stopped when the one or more first masked interrupts did not occur during the saving of the current state of the processor. The technique also determines whether one or more second masked interrupts occurred following the saving of the current state of the processor. The processor is powered-down when the one or more second masked interrupts did not occur following the saving of the current state of the processor.

18 Claims, 3 Drawing Sheets

TECHNIQUES FOR OPERATING A PROCESSOR SUBSYSTEM TO SERVICE MASKED INTERRUPTS DURING A POWER-DOWN SEQUENCE

BACKGROUND

1. Field

This disclosure relates generally to a processor subsystem and, more specifically, to techniques for operating a processor subsystem.

2. Related Art

In battery-powered systems, such as handheld computers and cellular telephones, in order to reduce power consumption and increase battery-life, designers have frequently designed the systems to enter a low-power (or deep sleep) state during periods of inactivity. In the low-power state, power has usually been removed from one or more portions of an integrated circuit (IC) that have relatively high leakage currents in order to increase battery-life. However, in such systems, a current state of a processor core (processor) has not usually been saved prior to causing the processor to enter the low-power state. As such, when an activity occurs (as, for example, indicated by an interrupt) that requires powering-up the systems, the systems have re-started in a boot-up state that is not indicative of a last state of the processor prior to entering the low-power state.

Typically, computer systems perform computational operations on data values stored in a set of processor registers. As each function within a program usually operates on its own set of registers, an active register set of a processor may change when a current function changes, e.g., during a function call operation or a function return operation. Usually, the function change involves saving a current register set to memory during a function call operation to make room for a new register set for the new function, and subsequently restoring the current register set from the memory during a corresponding function return operation. The process of saving and restoring register sets to memory can significantly degrade computer system performance. In some processor implementations, a physical register file is partitioned into an architectural register file and a working register file containing rename registers. In a rename stage, destination registers are allocated rename registers and the rename registers are copied back to the architectural register at retirement. In alternative implementations, the physical register file is not partitioned and a retire unit does not have to copy a working register to an architectural register.

In either implementation, during a save operation, the processor has usually allocated an entire window, even if the function generates only a subset of live registers in the window. In this case, a relatively large portion of the physical register file may contain dead or unused registers. These dead registers are usually recovered by a subsequent restore instruction. However, in an intervening period, the window may potentially be spilled/filled multiple times leading to decreased processor performance, as unused registers are spilled/filled. U.S. Pat. No. 7,127,592 discloses a technique in which dead registers are not included in fill/spill operations to decrease fill/spill operation overhead and increase processor performance. Similarly, U.S. Patent Application Publication No. 2006/0149940 discloses another technique for performing a save and restore on a context switch. Likewise, U.S. Patent Application Publication No. 2004/0215941 discloses yet another technique for handling window fill/spill operations using helper instructions. While the above-identified references (i.e., patent and publications) address increasing efficiency of save/restore operations during a context switch, the references do not address save/restore operations of a processor subsystem during a power-down or power-up sequence.

What is needed is a technique to save a correct processor state during a power-down sequence of a processor subsystem. It would also be desirable for the technique to restore the correct processor state during a subsequent power-up sequence of the processor subsystem.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
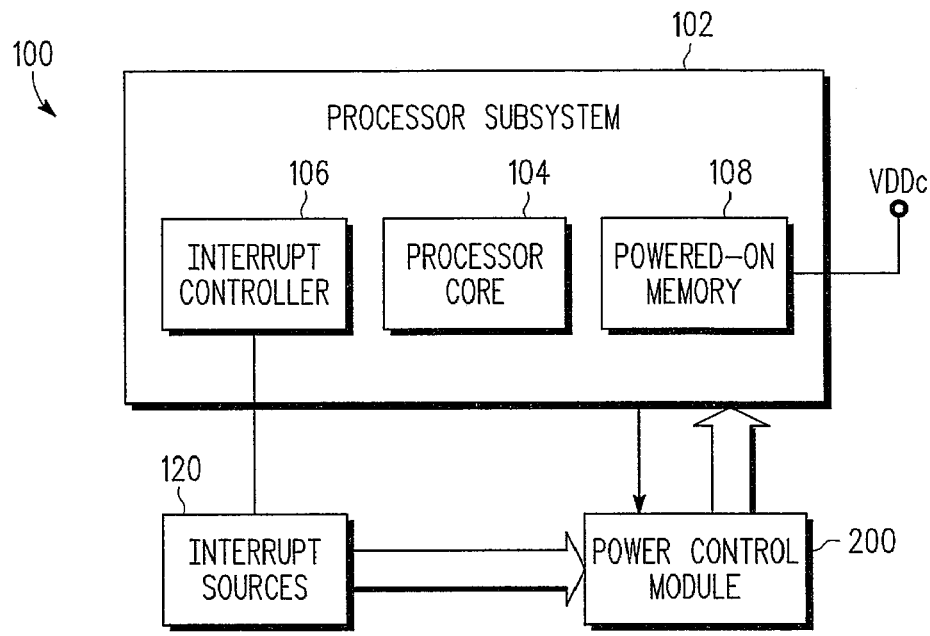
FIG. 1 is an electrical block diagram of a relevant portion of a system configured to save a processor state on power-down and restore the saved processor state on power-up, according to an embodiment of the present disclosure.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices, such as portable digital assistants (PDAs), digital cameras, portable storage devices, audio players, computer systems, and portable gaming devices, for example.

In battery-powered devices, battery-life is dependent upon operating currents when the device is operating and leakage currents when the battery-powered device is in a low-power (deep sleep) state. In order to reduce leakage currents when a battery-powered device is in a low-power state, various processor subsystem designers have removed power from selected, usually higher-power, portions of a processor subsystem of the device. According to various aspects of the present disclosure, techniques are described herein that facilitate correctly saving a processor state prior to entering a low-power state and correctly restoring the saved processor state upon exit from the low-power state. According to various embodiments, a power control module (PCM) is implemented between interrupt sources and a processor subsystem. The PCM includes logic that is configured to hold-off and detect interrupts that may occur during a power-down sequence of the processor subsystem. During the power-down sequence, a processor state is saved in a powered-on memory (i.e., a memory that is powered-up even when other portions of the processor subsystem are powered-down) of the processor subsystem. The PCM is also configured to reset the processor subsystem and supply a boot vector (address) to the processor subsystem that is used by the processor to restore the processor subsystem to the saved processor state when the processor subsystem exits the low-power state.

According to various aspects of the present disclosure, a software routine (save routine) is implemented to save an entire programming model (i.e., registers) of a processor in a powered-on memory. As noted above, the powered-on memory uses a different power supply (VDDc) than the portions of the processor subsystem that have power removed during the low-power state. Assuming that no interrupts are pending after the save routine saves the current processor state in the powered-on memory, logic of the PCM controls one or more switches to remove power from portions of the processor subsystem that are to be de-powered during a low-power state. When the processor subsystem comes out of the low-power state (in response to, for example, an interrupt or a command from a debug tool), the PCM restores power to de-powered portions of the processor subsystem. The PCM then issues a reset to the processor subsystem and disables interrupts. Another software routine (restore routine), executing on the processor, restores a programming model (i.e., registers) of the processor using the saved processor state stored in the powered-on memory. At the end of the restore routine, interrupts are enabled by, for example, asserting register bits associated with appropriate interrupts in an interrupt enable register of an interrupt controller inside the processor subsystem.

Figure 2:
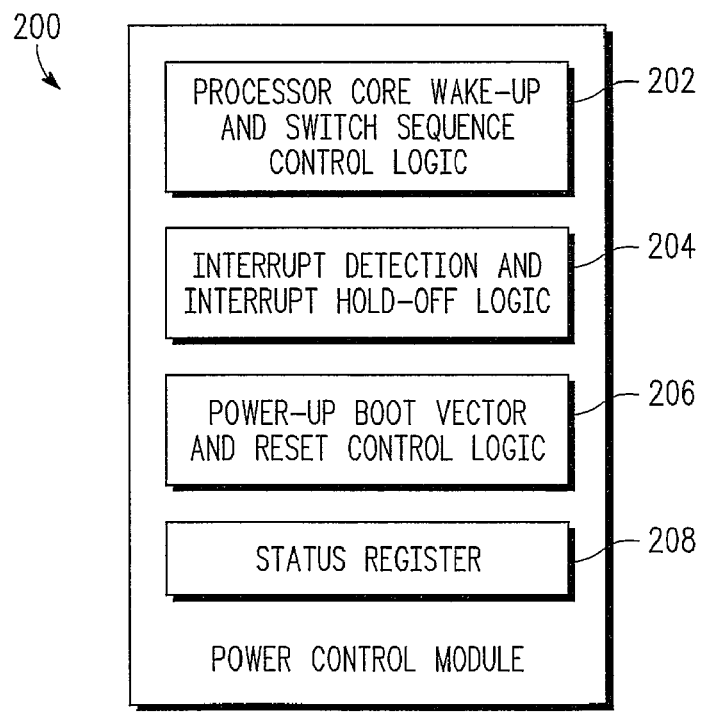
FIG. 2 is an electrical block diagram of a power control module of the system of FIG. 1.

With reference to FIG. 1, a relevant portion of a system 100 is illustrated. The system 100 may be incorporated within various devices, such as PDAs, digital cameras, portable storage devices, audio players, portable gaming devices, or mobile wireless communication devices, e.g., cellular telephones. The system 100 includes a processor subsystem 102, a power control module (PCM) 200, and interrupt source(s) 120. The PCM 200 receives interrupts, from the interrupt source(s) 120, e.g., another processor or other subsystem, that are directed to the processor subsystem 102. The processor subsystem 102 includes a processor core 104, an interrupt controller 106, and a powered-on memory 108, which remains powered when other portions of the processor subsystem 102 are powered-down. For example, power may be removed from the processor core 104 and the interrupt controller 106. It should be appreciated that other portions (not shown) of the processor subsystem 102 may or may not be powered-down. With reference to FIG. 2, the PCM 200 includes a processor core wake-up and switch sequence control logic module 202, an interrupt detection and interrupt hold-off logic module 204, a power-up boot vector and reset control logic module 206, and a status register 208. The status register 208 may provide the status of various components of the subsystem 102 to, for example, a debug tool.

Figure 3:
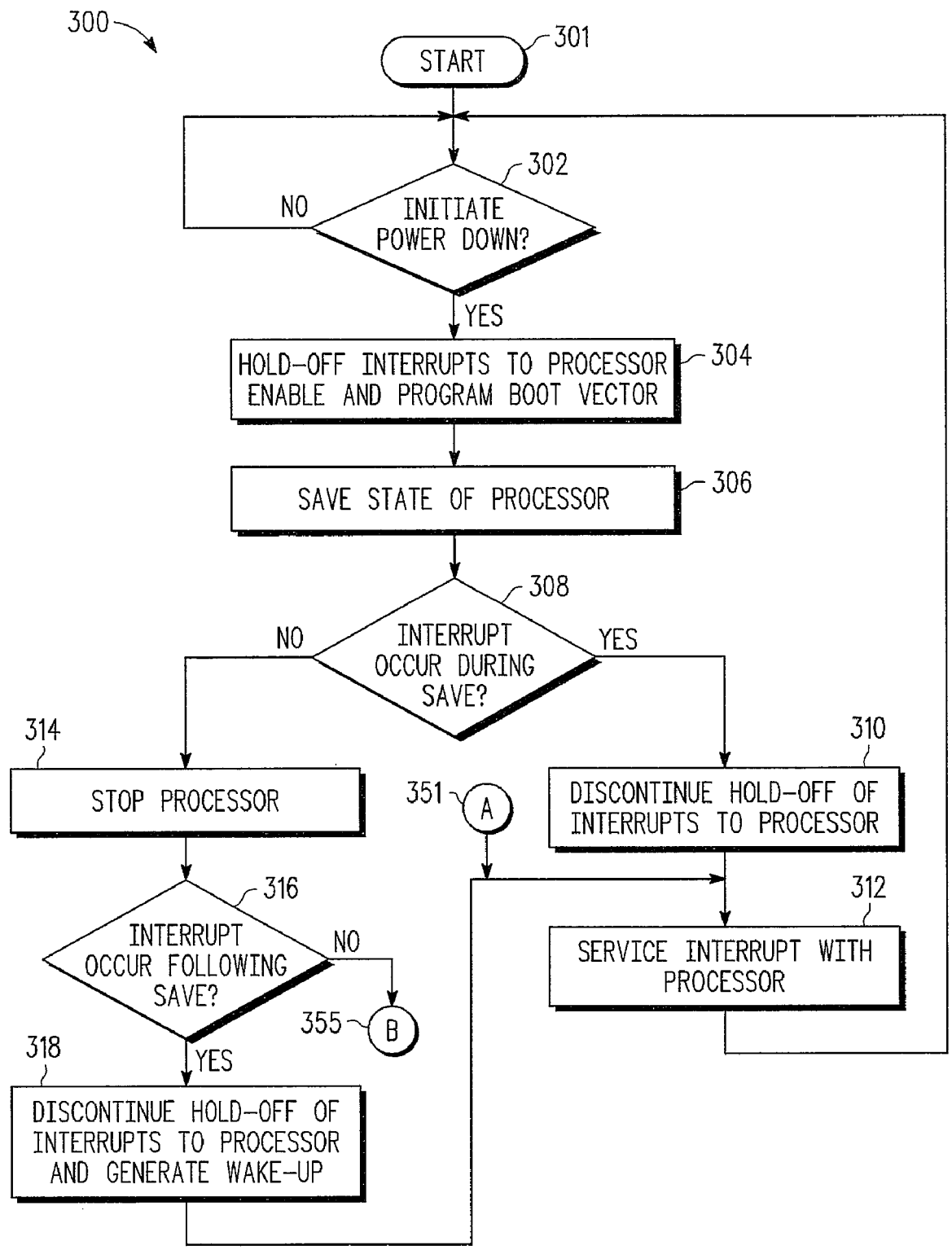
FIGS. 3-4 are a flow chart of an example process for powering-up and powering-down a processor of the system of FIG. 1.
Figure 4:
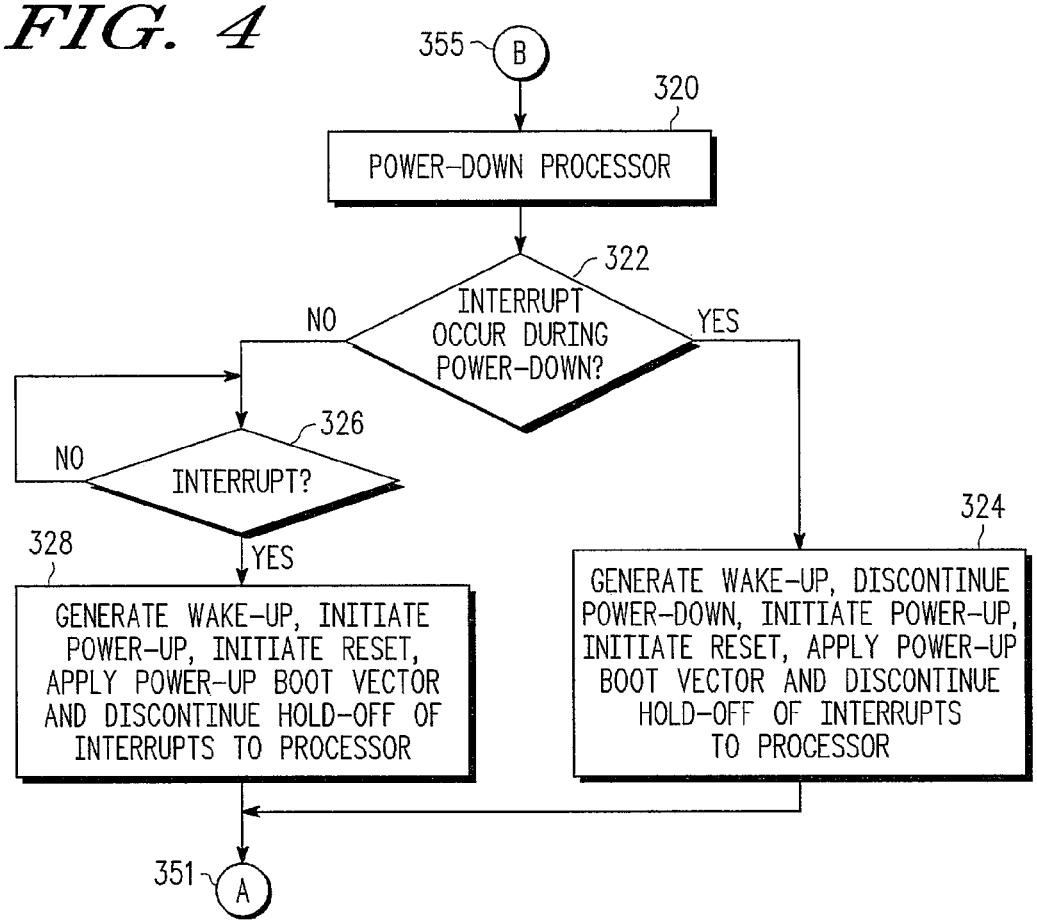

With reference to FIGS. 3-4, a process 300 for powering-down a processor subsystem while saving a current processor state is illustrated. Process 300 may be implemented in hardware, software, or a combination of both. In block 301, the process 300 is initiated at which point control transfers to decision block 302. In block 302, it is determined whether a power-down sequence for the processor subsystem 102 is indicated. Power-down of the subsystem 102 may be indicated, for example, when no external input has been received by the subsystem 102 for a specified time period. If a power-down sequence is not indicated, control loops on block 302 until power-down of the processor subsystem 102 is indicated. When power-down is indicated in block 302, control transfers to block 304. In block 304, interrupt hold-off logic of the module 204 in the power control module (PCM) 200 is configured to mask interrupts that may be generated by the interrupt source(s) 120. For example, a bit of an interrupt hold-off register may be asserted to cause the PCM 200 to mask interrupts. In conjunction with assertion of the bit of the interrupt hold-off register, a bit of an interrupt detection register may be deasserted to clear previously serviced interrupts. Also, in block 304, a boot vector (address) indicating a location of a saved processor state in the memory 108 is saved. The boot vector, which may be stored in a register in module 206, may be enabled by asserting a bit in a boot vector enable register in the module 206. Next, in block 306, a current state of the processor core (processor) 104 is saved in the powered-on memory 108 at the address indicated by the boot vector. Masking interrupts while saving the current state of the processor 104 ensures that the current processor state is saved without being corrupted.

Then, in decision block 308, the processor 104 determines whether the interrupt controller 106 received an interrupt from one or more of the interrupt sources 120 during the time period in which the current processor state was being saved. This may be determined by, for example, the processor 104 reading the bit of the interrupt detection register. If an interrupt was received (as indicated by the bit of the interrupt detection register being asserted) by the PCM 200 while the current processor state was being saved, control transfers from block 308 to block 310. In block 310, the interrupt hold-off register in the module 204 is deasserted. Next, in block 312 the processor 104 services the interrupt at which point control transfers to block 302. If an interrupt was not received by the interrupt controller 106 while the current processor state was being saved, control transfers from block 308 to block 314, where the processor 104 is stopped. Next, in decision block 316 it is determined whether an interrupt occurred following saving of the processor state. Whether an interrupt was received following saving of the processor state may be determined by, for example, logic within the PCM 200 determining whether an interrupt detection bit in the module 204 is asserted. If an interrupt was received following saving of the processor state control transfers to block 318, where hold-off of processor interrupts by the PCM 200 is discontinued. Also, in block 318, module 202 generates a wake-up to the processor 104.

Following block 318 control transfers to block 312, where the processor 104 services the interrupt. If an interrupt was not received following saving of the processor state, control transfers from block 316 to block 320 (FIG. 4) where power-down of processor 104 is initiated. Following block 320, control transfers to decision block 322. In block 322 it is determined whether an interrupt occurred during the power-down sequence. As above, logic within the PCM 200 may monitor status of an interrupt detection register in the module 204 to determine whether an interrupt was received by the PCM 200 during the power-down sequence. If an interrupt was received during the power-down sequence, control transfers from block 322 to block 324. In block 324, the module 202 generates a wake-up to the processor 104 and controls one or more switches to provide power to powered-down portions of the processor subsystem 102. The module 206 of the PCM 200 initiates a reset of the processor 104 and causes the saved processor state in the memory 108 to be loaded into appropriate internal registers of the processor 104. The PCM 200 also discontinues hold-off of interrupts to the processor 104. Following block 324, control transfers to block 312, where the interrupt/interrupts is/are serviced. Control then transfers from block 312 to block 302. In block 322 when an interrupt occurred during power-down, control transfers to decision block 326. Control loops on block 326 until an interrupt occurs.

Following receipt of an interrupt by the PCM 200 in block 326, control transfers to block 328. In block 328 the module 202 generates a wake-up to the processor 104 and controls one or more switches to initiate a power-up of the processor subsystem 102. The module 206 initiates a reset of the processor 104 and loading of the saved processor state from the memory 108 to internal registers of the processor 104. The PCM 200 also discontinues hold-off of interrupts to the processor 104. Following block 328, control transfers to block 312, where the interrupt is serviced. Control then transfers from block 312 to block 302.

It should be appreciated that the functionality of the different modules 202-206 is only provided as an example. That is, the disclosed functionality may be implemented within different modules and the modules 202-206 may include additional or different functionality. Accordingly, a technique has been disclosed herein that facilitates correctly saving a processor state prior to entering a power-down state and correctly restoring the saved processor state upon exit from the power-down state.

Figure 5:
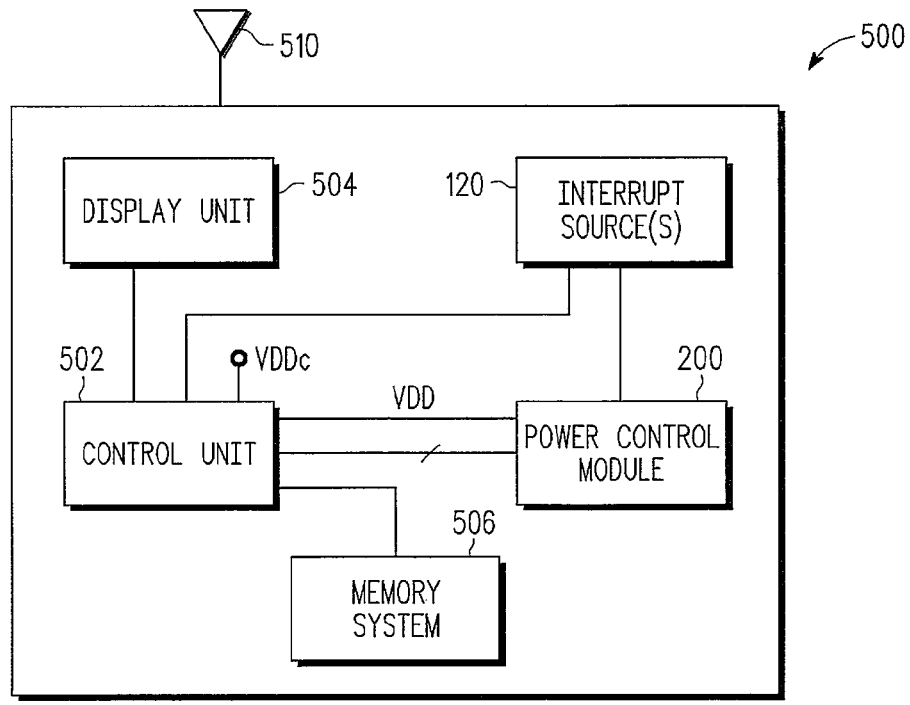
FIG. 5 is an electrical block diagram of the system of FIG. 1 when incorporated within a mobile wireless communication device

With reference to FIG. 5, an example system 500 is illustrated that incorporates the processor subsystem 102 within control unit 502. As is shown, the control unit 502 is coupled to a memory subsystem 506, which may store various application and operating software. The control unit 502 is also coupled to a display unit 504 (e.g., a liquid crystal display (LCD)) and interrupt source(s) 120, which may include, for example, other processors, subsystems, and an input device, e.g., a keypad. The system 500 may include an antenna 510 and a transceiver (not shown) when the system 500 takes the form of a mobile wireless communication device.

As used herein, a software system can include one or more objects, agents, threads, subroutines, separate software applications, one or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable read-only memories (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, the processor subsystem described herein may include various other components (e.g., multiple processors and clock generators) that may also be powered-down when the processor subsystem is in a low-power state. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a processor subsystem, comprising:
   masking interrupts to the processor subsystem during a power-down sequence of a processor of the processor subsystem;
   setting a boot vector for the processor of the processor subsystem, the boot vector providing an address associated with a saved processor state;
   saving a current state of the processor to provide the saved processor state;
   determining whether one or more first masked interrupts occurred during the saving of the current state of the processor;
   stopping the processor that is to be powered-down when the one or more first masked interrupts did not occur during the saving of the current state of the processor;
   determining whether one or more second masked interrupts occurred following the saving of the current state of the processor; and
   powering-down the processor when the one or more second masked interrupts did not occur following the saving of the current state of the processor.

2. The method of claim 1, further comprising:
   receiving an indication that the processor is to be powered-down.

3. The method of claim 1, further comprising:
   unmasking the interrupts to the processor subsystem when the one or more first masked interrupts occurred during the saving of the current state of the processor; and
   servicing the one or more first masked interrupts with the processor when the one or more first masked interrupts occurred during the saving of the current state of the processor.

4. The method of claim 1, further comprising:
   unmasking the interrupts to the processor subsystem when the one or more second masked interrupts occurred following the saving of the current state of the processor;
   generating a wake-up signal to the processor when the one or more second masked interrupts occurred following the saving of the current state of the processor; and
   servicing the one or more second masked interrupts with the processor when the one or more second masked interrupts occurred following the saving of the current state of the processor.

5. The method of claim 1, further comprising:
   monitoring for one or more post power-down interrupts;

unmasking the interrupts to the processor subsystem based on occurrence of the one or more post power-down interrupts;

generating a wake-up signal to the processor based on occurrence of the one or more post power-down interrupts;

powering-up the processor based on occurrence of the one or more post power-down interrupts;

restoring a state of the processor with the saved processor state based on occurrence of the one or more post power-down interrupts; and servicing the one or more post power-down interrupts with the processor.

6. The method of claim 1, further comprising:

determining whether one or more third masked interrupts occurred during the powering-down of the processor;

unmasking the interrupts to the processor subsystem based on occurrence of the one or more third masked interrupts;

generating a wake-up signal to the processor based on occurrence of the one or more third masked interrupts;

powering-up the processor based on occurrence of the one or more third masked interrupts;

restoring a state of the processor with the saved processor state based on occurrence of the one or more third masked interrupts; and servicing the one or more third masked interrupts with the processor.

7. The method of claim 1, wherein the setting further comprises:

enabling and programming the boot vector for the processor of the processor subsystem.

8. A system, comprising:

a processor subsystem including a processor;

a power control module coupled between the processor subsystem and an interrupt source, wherein the power control module is configured to mask interrupts to the processor subsystem during a power-down sequence of the processor of the processor subsystem; and wherein the system is further configured to determine whether one or more first masked interrupts occurred during the saving of the current state of the processor and control the power control module to unmask the interrupts to the processor subsystem when the one or more first masked interrupts occurred during the saving of the current state of the processor, and wherein the processor is further configured to service the one or more first masked interrupts when the one or more first masked interrupts occurred during the saving of the current state of the processor.

9. The system of claim 8, wherein the power control module is further configured to store a boot vector for the processor of the processor subsystem, the boot vector providing an address associated with a saved processor state.

10. The system of claim 8, the processor subsystem further comprising:

a powered-on memory, wherein the powered-on memory is configured to store a current state of the processor to provide a saved processor state during and following the power-down sequence.

11. A system comprising:

a processor subsystem including a processor;

a power control module coupled between the processor subsystem and an interrupt source, wherein the power control module is configured to mask interrupts to the processor subsystem during a power-down sequence of the processor of the processor subsystem; and wherein the processor is further configured to stop when one or more first masked interrupts did not occur during the saving of the current state of the processor, and wherein the power control module is further configured to determine whether one or more second masked interrupts occurred following the saving of the current state of the processor and power-down the processor when the one or more second masked interrupts did not occur following the saving of the current state of the processor.

12. The system of claim 11, wherein the power control module is further configured to unmask the interrupts to the processor subsystem when the one or more second masked interrupts occurred following the saving of the current state of the processor and generate a wake-up signal to the processor when the one or more second masked interrupts occurred following the saving of the current state of the processor, and wherein the processor is further configured to service the one or more second masked interrupts when the one or more second masked interrupts occurred following the saving of the current state of the processor.

13. The system of claim 11, wherein the power control module is further configured to determine whether one or more third masked interrupts occurred during the powering-down of the processor and monitor for one or more post power-down interrupts when the one or more third masked interrupts did not occur during the powering-down of the processor.

14. The system of claim 13, wherein the power control module is further configured to unmask the interrupts to the processor subsystem based on occurrence of the one or more post power-down interrupts, generate a wake-up signal to the processor based on occurrence of the one or more post power-down interrupts and power-up the processor based on occurrence of the one or more post power-down interrupts, and wherein the processor is further configured to restore a state of the processor with the saved processor state based on occurrence of the one or more post power-down interrupts and service the one or more post power-down interrupts.

15. The system of claim 11, wherein the power control module is further configured to determine whether one or more third masked interrupts occurred during the powering-down of the processor, unmask the interrupts to the processor subsystem based on occurrence of the one or more third masked interrupts, generate a wake-up signal to the processor based on occurrence of the one or more third masked interrupts, power-up the processor based on occurrence of the one or more third masked interrupts and set a restore of a state of the processor with the saved processor state based on occurrence of the one or more third masked interrupts, and wherein the processor is further configured to service the one or more third masked interrupts with the processor.

16. A power control module coupled between a processor subsystem and an interrupt source, the power control module comprising:

a first module configured to mask and detect interrupts to the processor subsystem during a power-down sequence of a processor of the processor subsystem;

a second module configured to store a boot vector for the processor of the processor subsystem, the boot vector providing an address associated with a saved processor state of the processors;

wherein the power control module is further configured to determine whether one or more second masked interrupts occurred following saving of the saved processor state and power-down the processor when the one or more second masked interrupts did not occur following the saving of the saved processor state; and wherein the power control module is further configured to unmask the interrupts to the processor subsystem when the one or more second masked interrupts occurred following the saving of the saved processor state and generate a wake-up signal to the processor when the one or more second masked interrupts occurred following the saving of the saved processor state.

17. The power control module of claim 16, wherein the power control module is further configured to determine whether one or more second masked interrupts occurred following saving of the saved processor state and power-down the processor when the one or more second masked interrupts did not occur following the saving of the saved processor state.

18. The power control module of claim 17, wherein the power control module is further configured to unmask the interrupts to the processor subsystem when the one or more second masked interrupts occurred following the saving of the saved processor state and generate a wake-up signal to the processor when the one or more second masked interrupts occurred following the saving of the saved processor state.

* * * * *